United States Patent
Hutson et al.

(10) Patent No.: US 8,028,911 B1
(45) Date of Patent: Oct. 4, 2011

(54) SEMI-AUTOMATIC SPRING/CYLINDER MECHANISM IN A HAND-OPERATED DOCUMENT READER/IMAGER

(75) Inventors: Sammy C. Hutson, Novi, MI (US); Michael J. Moore, Beverly Hills, MI (US); John C. Gudenburr, Canton, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 475 days.

(21) Appl. No.: 11/895,227

(22) Filed: Aug. 23, 2007

(51) Int. Cl.
*G06K 7/08* (2006.01)

(52) U.S. Cl. ........ 235/449; 235/375; 235/379; 235/435; 235/439; 235/440; 235/444; 235/450; 382/139; 382/140

(58) Field of Classification Search .................. 235/375, 235/379, 435, 439, 440, 444, 449, 450; 382/139, 382/140
See application file for complete search history.

(56) References Cited

U.S. PATENT DOCUMENTS

| | | | |
|---|---|---|---|
| 3,780,264 A * | 12/1973 | Kondur et al. | 360/130.2 |
| 3,940,796 A * | 2/1976 | Haun et al. | 360/2 |
| 3,953,887 A * | 4/1976 | Kobylarz et al. | 360/2 |
| 4,031,359 A * | 6/1977 | Christou et al. | 235/449 |
| 4,047,229 A * | 9/1977 | Kobylarz et al. | 360/2 |
| 4,087,789 A * | 5/1978 | Beery | 382/320 |
| 4,764,976 A * | 8/1988 | Kallin et al. | 382/321 |
| 5,054,092 A * | 10/1991 | LaCaze | 382/139 |
| 5,444,616 A * | 8/1995 | Nair et al. | 705/17 |
| 5,517,577 A * | 5/1996 | Wagner | 382/135 |
| 6,659,347 B1 * | 12/2003 | Moore et al. | 235/449 |
| 2006/0203299 A1 * | 9/2006 | Nihashi | 358/474 |

* cited by examiner

*Primary Examiner* — Daniel Hess
*Assistant Examiner* — Ali Sharifzada
(74) *Attorney, Agent, or Firm* — Honigman Miller Schwartz and Cohn LLP

(57) ABSTRACT

A hand-operated document processor has a base for receiving a document containing magnetic ink character data to be read and recognized. A manually operated moving magnetic ink character recognition (MICR) subsystem includes a MICR read head and is attached to the base. Movement of the subsystem causes the MICR read head to pass over the magnetic ink character data on the document. MICR reading and recognition logic receives the signal from the MICR read head. A spring/cylinder mechanism includes a spring providing the force necessary to drive the moving MICR subsystem, and includes a dashpot composed of a piston and cylinder arranged such that the spring moves the MICR subsystem across the document being processed and drives the piston in the cylinder, thereby damping the motion of the MICR subsystem.

19 Claims, 10 Drawing Sheets

SPRING LOAD VS. EXTENSION

LOAD ACCELERATION

Velocity

PNEUMATIC CYLINDER
RESISTANCE LOAD

SEMI-AUTOMATIC SPRING/CYLINDER MECHANISM IN A HAND-OPERATED DOCUMENT READER/IMAGER

BACKGROUND OF THE INVENTION

1. Field of the Invention

The invention relates to document processing, document imaging, and magnetic ink character recognition. The invention further relates to hand-operated document readers/imagers, and to methods and systems for providing controlled and repeatable motion in a non-motorized system.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In addition to large document processing systems that handle stacks of documents, smaller systems also exist. These smaller document processing systems may handle smaller stacks of documents, or may even handle single documents, fed one at a time. There are also hand-operated document readers/imagers.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006 (formerly published as X9.27) "Print and Test Specifications for Magnetic Ink Printing (MICR)" as published by Accredited Standards Committee X9, Inc., Annapolis, Md., United States. Based on the design of the standard E-13B character set, in order that a MICR reader reliably read with a high correct character read rate and with a very low substitution rate, the document velocity must be precisely known during reading or otherwise be speed-controlled so that it does not vary.

These conventional approaches are acceptable when the velocity of the document is either known or can be controlled. In fact, conventional approaches to MICR typically involve rather complex schemes for controlling the velocity of the document or attempting to measure its velocity at different times as the document moves past the MICR read head. There has also been an approach to MICR reading and recognition that utilizes a dual gap read head to eliminate the need for precise knowledge or control of the document velocity.

In a hand-operated document reader/imager, the document is placed on a base and the MICR/image device is moved over the document from right to left, which is the traditional direction of larger document readers. During this movement, the MICR characters are recognized and the front image of the document is captured.

In more detail, the operational sequence of a manually operated linear check or document scanning device is as follows. A check or document is positioned on the bed of the device. The module that holds the contact image sensor and the magnetic read head is moved across the check or document, with the module being guided by a linear rod. The magnetic read head reads the MICR code line at the bottom of the document, and the contact image sensor scans the document. Data from both devices are passed to the electronics of the system for processing.

In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error.

The contact image sensor has a maximum speed limit, beyond which it will fail to operate properly. And, the MICR reader has a minimum speed limit, below which it cannot reliably operate. Accordingly, the speed of the scan must remain between these limits.

A motorized system can provide the required speed control, but is expensive. With a simple inexpensive manual operation, the scanning speed can and will vary from item to item, and over the length of the scan of a single item.

For the foregoing reasons, there is a need for an improved method and system for providing controlled and repeatable motion in a non-motorized hand-operated reader/imager.

SUMMARY OF INVENTION

It is an object of the invention to provide an improved method and system for providing controlled and repeatable motion in a non-motorized hand-operated reader/imager.

According to the invention, a hand-operated document processor comprises a base for receiving a document containing magnetic ink character data to be read and recognized, and a moving magnetic ink character recognition (MICR) subsystem. The subsystem includes a MICR read head and is attached to the base such that movement of the subsystem causes the MICR read head to pass over the magnetic ink character data on the document. MICR reading and recognition logic receives the signal from the MICR read head.

In some implementations, the moving MICR subsystem further comprises an image sensor that passes over the document as the MICR read head passes over the magnetic ink character data on the document.

A spring mechanism provides the force necessary to drive the moving MICR subsystem. Preferably, the operator input is limited to sliding the MICR subsystem or scanning module to the start position thereby cocking the spring mechanism, and a latch holds the MICR subsystem against the spring force.

In operation of the preferred embodiment of the hand-operated document processor, once the MICR subsystem is at the start position, the document is positioned on the base of the hand-operated document reader/imager. The operator presses a release to allow the spring to pull the MICR subsystem across the document. The energy stored in the spring drives the moving MICR subsystem over the face of the document at a controlled speed.

To provide further velocity control over the required scanning distance, the invention comprehends the use of a dashpot or viscous damper. In the preferred embodiment of the hand-operated document processor, a spring and pneumatic cylinder mechanism is connected to the MICR subsystem or scanning module by, for example, a belt and pulley system. The action of the spring moves the module across the length of the check or document being scanned and will drive a piston in the pneumatic cylinder at a rate that is directly proportional to the speed of the scanning module. A reduction mechanism, for example, in the form of a pulley ratio or gear reduction may allow travel of the spring and piston to be less than the travel of the scanning module to reduce the size and complexity of the spring mechanism and cylinder.

In a preferred embodiment, the cylinder is constructed with one or more bleed orifices in the cylinder that will be sized to provide minimal resistance to movement at slow speeds and very high resistance to movement at speeds that approach the speed limit of the contact image sensor. The orifices may be adjustable to tune out any variations in friction and system drag during manufacture and over the life of the system.

DETAILED DESCRIPTION OF THE PREFERRED EMBODIMENTS

The E-13B character set contains ten characters and four symbols as defined in the ANS X9.100-20-2006 (formerly published as X9.27) "Print and Test Specifications for Magnetic Ink Printing (MICR)" as published by Accredited Standards Committee X9, Inc., Annapolis, Md., United States. When used on a document for automated machine reading, the characters and symbols in the set must be printed using magnetic ink. ANS X9.100-20-2006 defines the dimensions of each character/symbol and the expected nominal waveform peak position and relative amplitude of waveform peaks.

Figure 1:
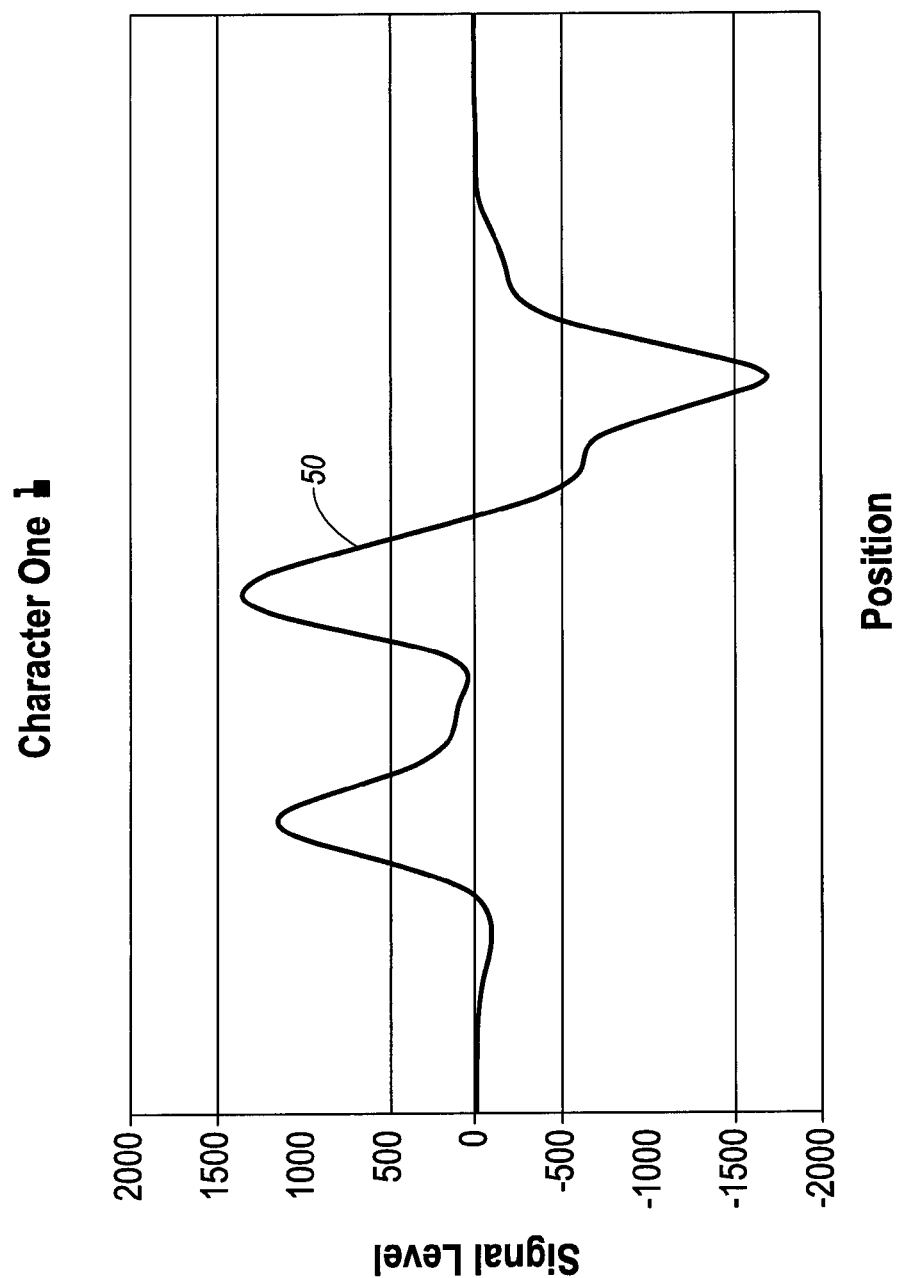
FIG. 1 shows the waveform for the magnetic ink character one, from the E-13B MICR character set as used on many financial payment documents, as read from a responsive magnetic signal gap read head when the magnetized character is passed by the magnetic read head.

FIG. 1 shows the waveform for the magnetic ink character one, from the E-13B MICR character set, as read from a responsive magnetic signal gap read head when the magnetized character is passed by the magnetic read head. The waveform is indicated at 50. As illustrated, the x-axis represents the position of the read head, and the y-axis represents the signal level.

MICR reading and recognition generally involves determining peak position information for a waveform generated by a single gap magnetic read head that passes over the magnetic ink characters on a document. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in ANS X9.100-20-2006.

Figure 2:
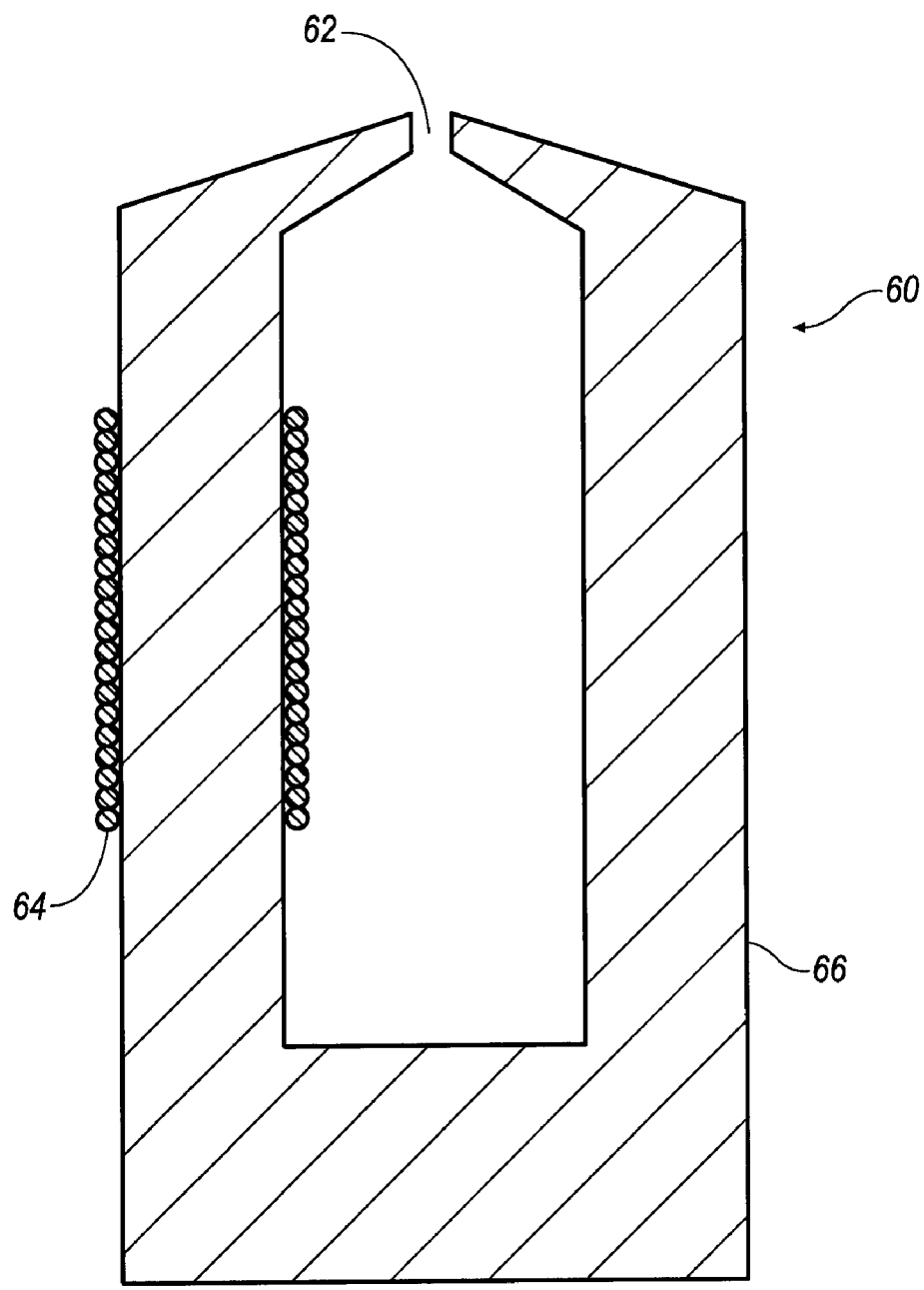
FIG. 2 is a cross-section view of a read head, which is one example of a suitable read head for reading magnetic ink characters.

In FIG. 2, a read head is generally indicated at 60, and includes a gap 62. The read head utilizes sensing coil 64. Core 66 forms a path for the magnetic flux changes experienced when the reader passes over magnetic ink. Of course, it is appreciated that alternative readers may be used, and any suitable technique may be utilized for assuring that flux variation from the magnetic ink characters is sensed.

Figure 3:
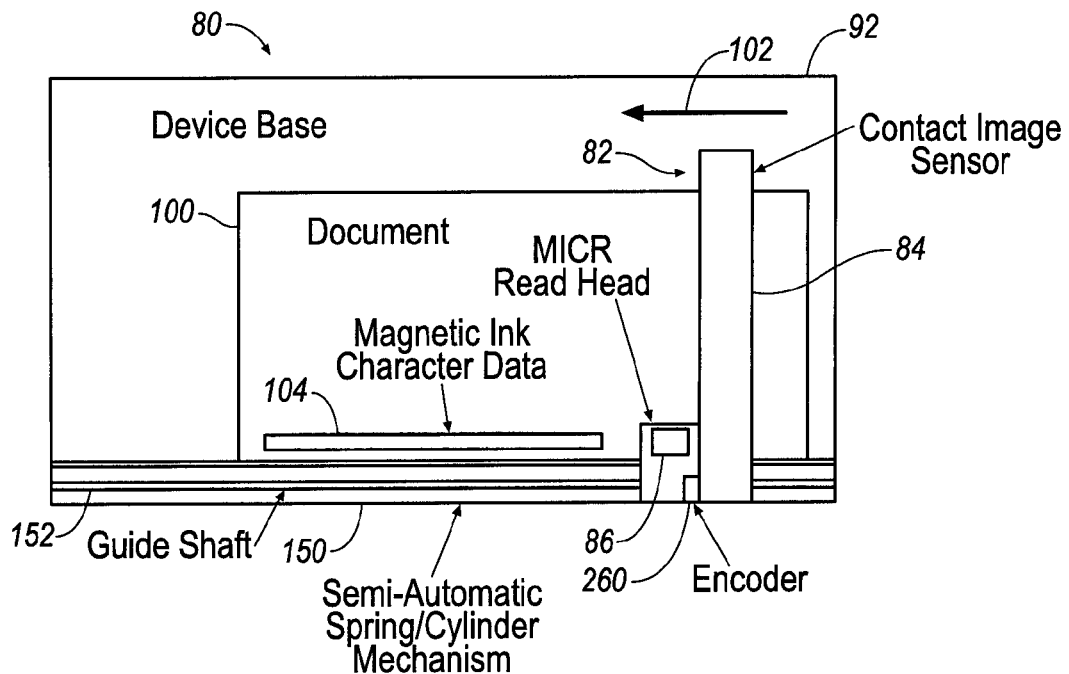
FIG. 3 illustrates a top view of a hand-operated document reader/imager made in accordance with the invention.
Figure 4:
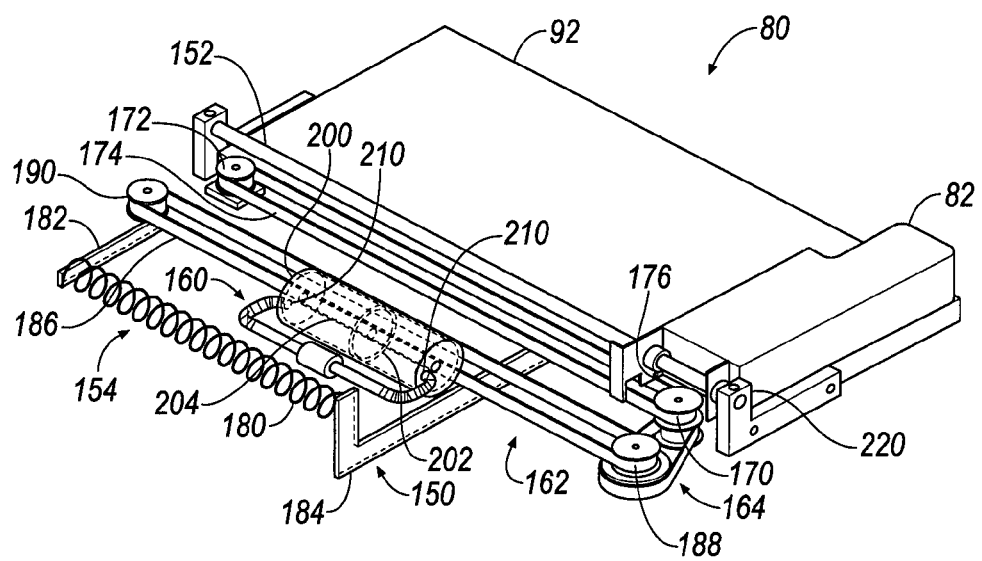
FIG. 4 illustrates a schematic diagram depicting the spring/cylinder mechanism in an exemplary implementation.
Figure 5:
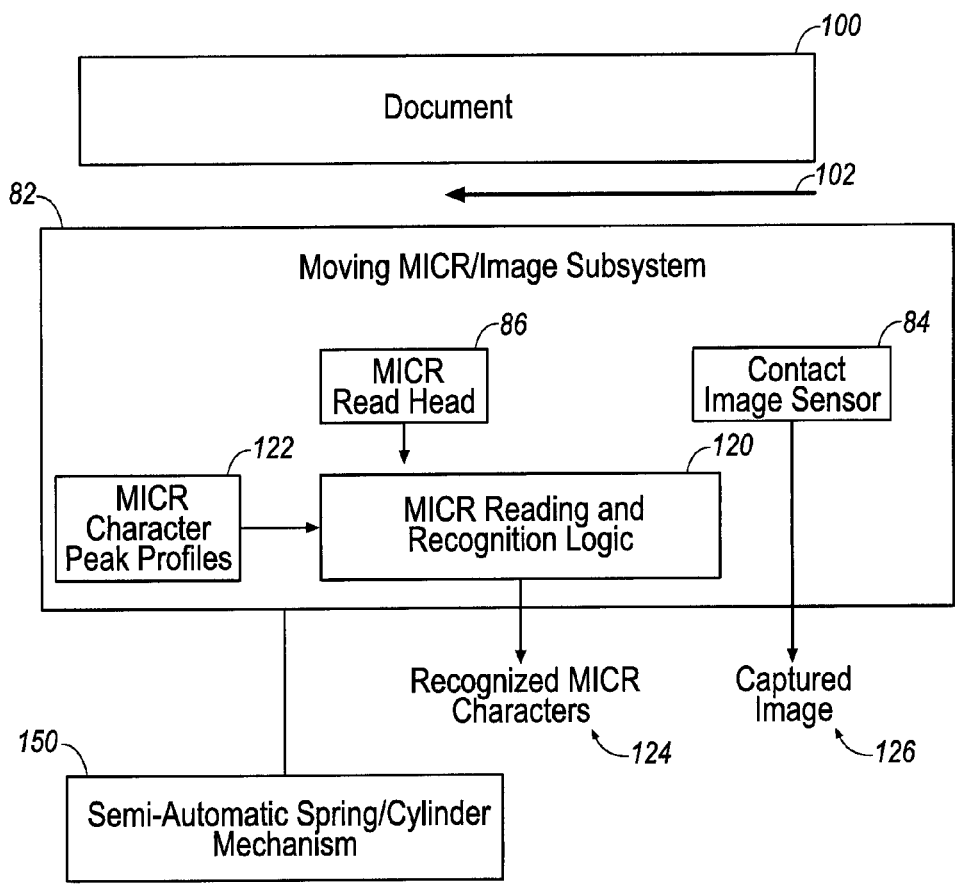
FIG. 5 is a block diagram illustrating a moving MICR/image subsystem including a semi-automatic spring/cylinder mechanism.

An exemplary embodiment of the invention is illustrated in FIGS. 3-5. FIGS. 3 and 4 illustrate a hand-operated document reader/imager 80. As best shown in FIG. 3, document reader/imager 80 includes a moving MICR/image subsystem 82. Subsystem 82 includes a contact image sensor 84, and a MICR read head 86. Contact image sensor 84 captures an image of the document 100 when subsystem 82 is moved across the document 100. Contact image sensor 84 captures the front image of the document 100 when the document 100 is placed face-up on the base 92 of the reader/imager 80 and the MICR/image subsystem 82 is moved from right to left over document 100 as indicated by arrow 102.

MICR read head 86 is for reading the magnetic ink character data 104 on document 100. During the front image capture, the MICR code line is read according to a traditional MICR algorithm as MICR read head 86 passes from right to left over the magnetic ink character data 104 on document 100.

With continuing reference to FIGS. 3 and 4, a semi-automatic spring/cylinder mechanism 150 includes a spring mechanism 154 to provide the force necessary to drive the moving MICR subsystem 82. To provide further velocity control over the required scanning distance, spring/cylinder mechanism 150 further includes a pneumatic cylinder mechanism 160. The spring/cylinder mechanism 150 is connected by a belt and pulley system 162 to a belt and pulley speed reduction mechanism 164 to drive moving MICR/image subsystem 82 at the required speed for scanning. Moving MICR/ image subsystem 82 rides along a linear guide shaft 152 and holds the contact image sensor 84 and the magnetic read head 86. The magnetic read head 86 reads the MICR code line 104 at the bottom of the document 100, and the contact image sensor 84 scans the document 100. In further detail, the belt and pulley reduction mechanism 164 drives pulley 170. Pulley 170 is connected to pulley 172 by belt 174. MICR/image subsystem 82 is secured, at attachment member 176, to belt 174 such that spring/cylinder mechanism 150 is able to drive the MICR/image subsystem 82.

In more detail, spring mechanism 154 includes extension spring 180 connected between member 182 which is secured to belt 186 and member 184 which is secured to base 92 of document reader/imager 80. In addition to belt 186, belt and pulley system 162 includes pulleys 188 and 190, holding belt 186. Cylinder mechanism 160 includes double-ended pneumatic cylinder 200 and piston 202. On each side of piston 202, belt 186 is connected to an end of a piston rod 204, and cylinder 200 is secured with respect to piston 202. Speed reduction mechanism 164 allows travel of the spring 180 and piston 202 to be less than the travel of the MICR subsystem 82 to reduce the size and complexity of the spring mechanism and cylinder. The action of the spring 180 moves the MICR subsystem 82 across the length of the check or document being scanned and will drive piston 202 in the pneumatic cylinder 200 at a rate that is directly proportional to the speed of the MICR subsystem 82.

Preferably, the operator input is limited to sliding the MICR subsystem 82 to the start position thereby cocking the spring mechanism 154, and a latch and release mechanism 220 holds the MICR subsystem 82 against the spring force. In the preferred embodiment illustrated in FIGS. 3 and 4, the cylinder 200 is constructed with a pair of bleed orifices 210 sized to provide minimal resistance to movement at slow speeds and very high resistance to movement at speeds that approach the speed limit of the contact image sensor 84. The orifices 210 may be adjustable to tune out any variations in friction and system drag during manufacture and over the life of the system.

With continuing reference to FIGS. 3 and 4, in operation of the preferred embodiment, once the document 100 is positioned on the base 92 of the hand-operated document reader/imager 80, the operator presses the release 220 to allow the spring 180 to pull the MICR subsystem 82 across the document. The energy stored in the spring 180 drives the moving MICR subsystem 82 over the face of the document at a controlled speed.

Figure 6:
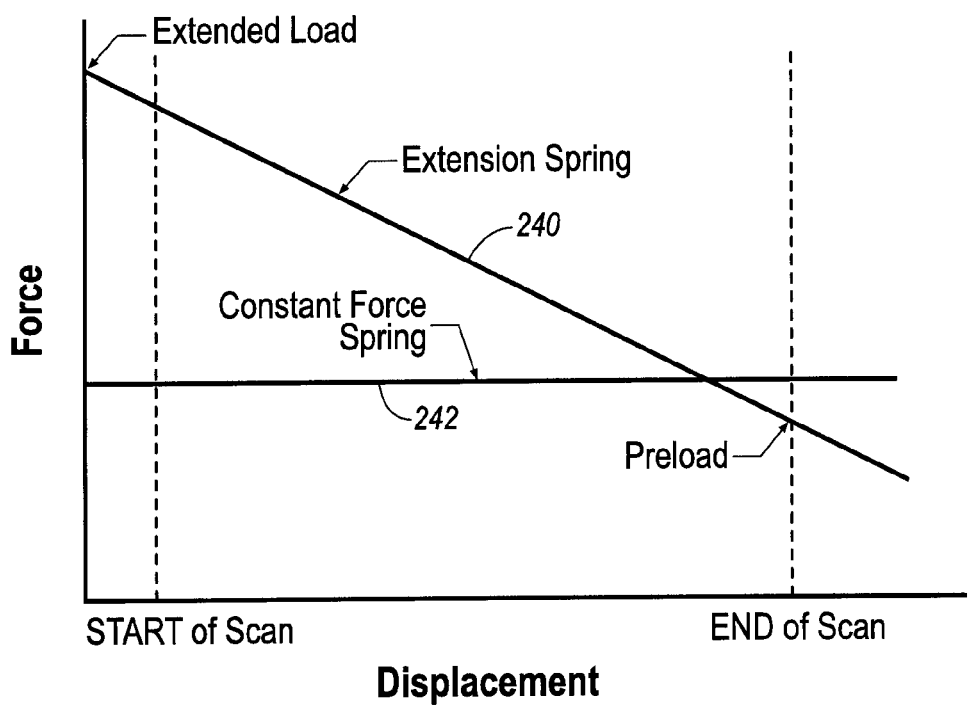
FIG. 6 is a plot of force versus displacement, illustrating spring load versus extension for an extension spring and for a constant force spring.
Figure 7:
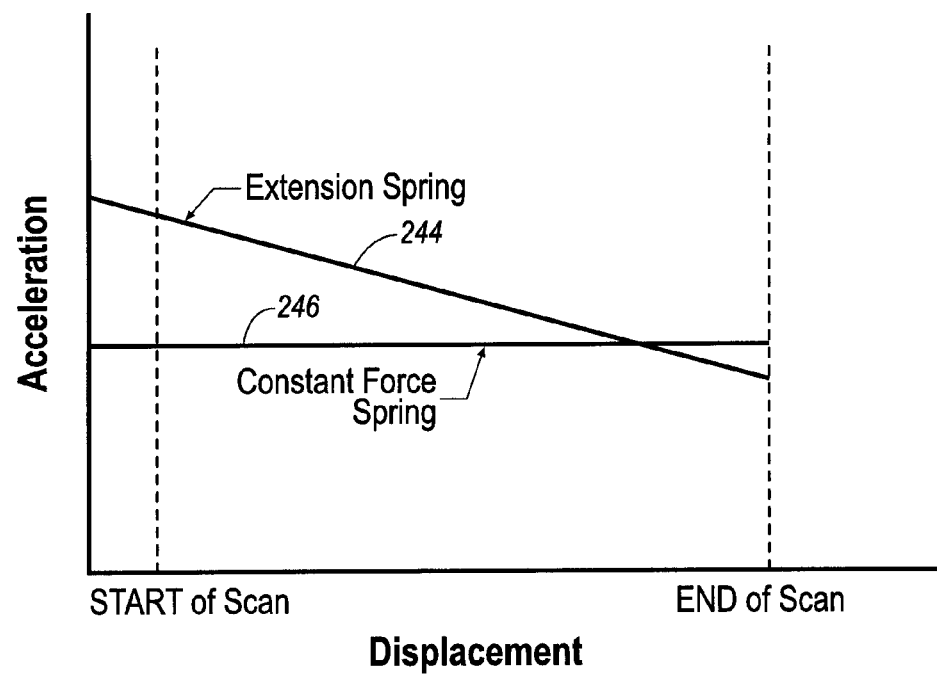
FIG. 7 is a plot of acceleration versus displacement, illustrating load acceleration for an extension spring and for a constant force spring.
Figure 8:
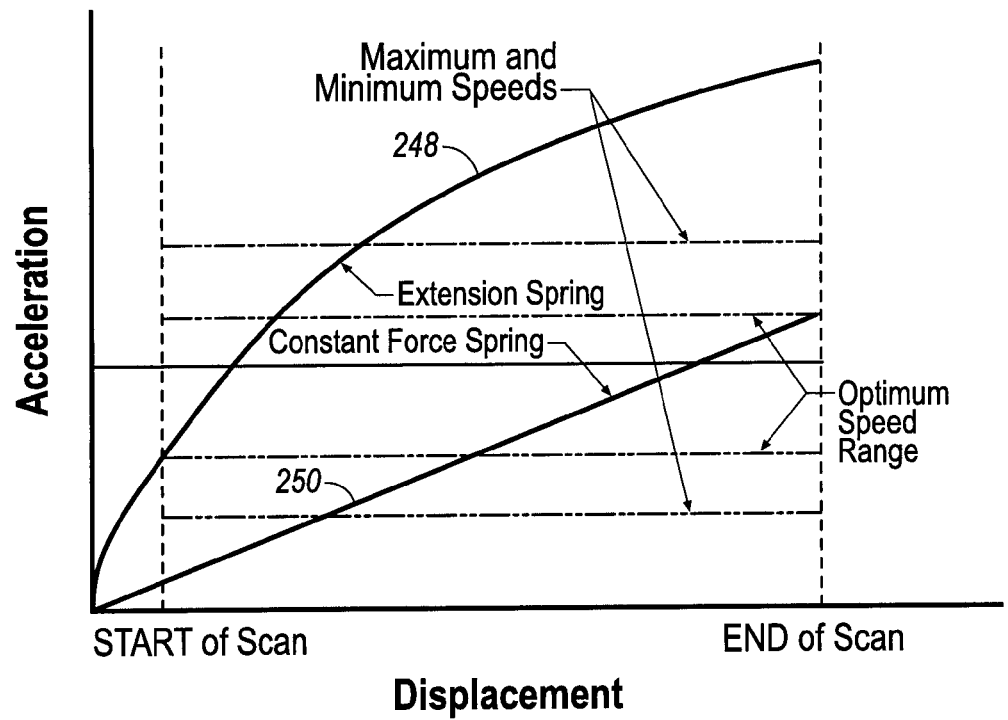
FIG. 8 is a plot of velocity versus displacement, illustrating load velocity for an extension spring and for a constant force spring.

There are several types of springs available that could provide the necessary spring force. FIG. 6 is a plot of force versus displacement, illustrating spring load versus extension for an extension spring at 240 and for a constant force spring at 242. As shown in FIG. 6, it is possible to have a steadily decreasing load 240 using a simple and inexpensive extension spring or a constant load 242 over the entire travel with a more complex and more expensive constant force spring mechanism. Either spring would be much cheaper than a motorized system. FIG. 7 is a plot of acceleration versus displacement, illustrating load acceleration for an extension spring at 244 and for a constant force spring at 246. These springs would provide either a steadily decreasing acceleration 244 or a constant acceleration 246 of the scan module, as shown in FIG. 7. Neither of these springs, acting alone, will provide the necessary velocity control over the required scanning distance of a maximum sized document, as shown in FIG. 8. In FIG. 8, a plot of velocity versus displacement illustrates load velocity for an extension spring at 248 and for a constant force spring at 250.

Figure 9:
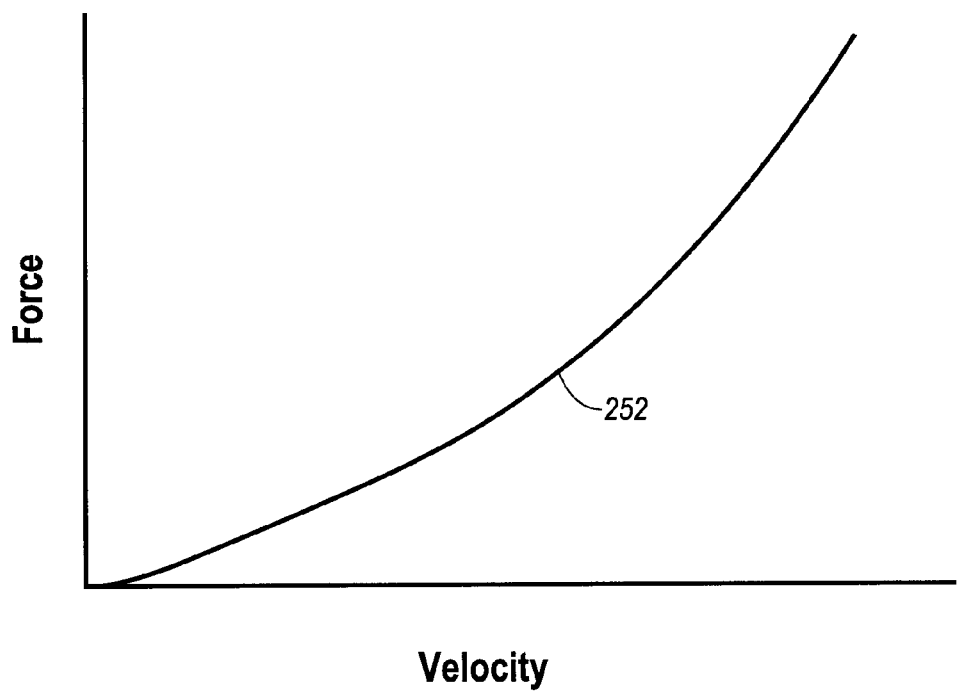
FIG. 9 is a plot of force versus velocity for a pneumatic cylinder resistance load.
Figure 10:
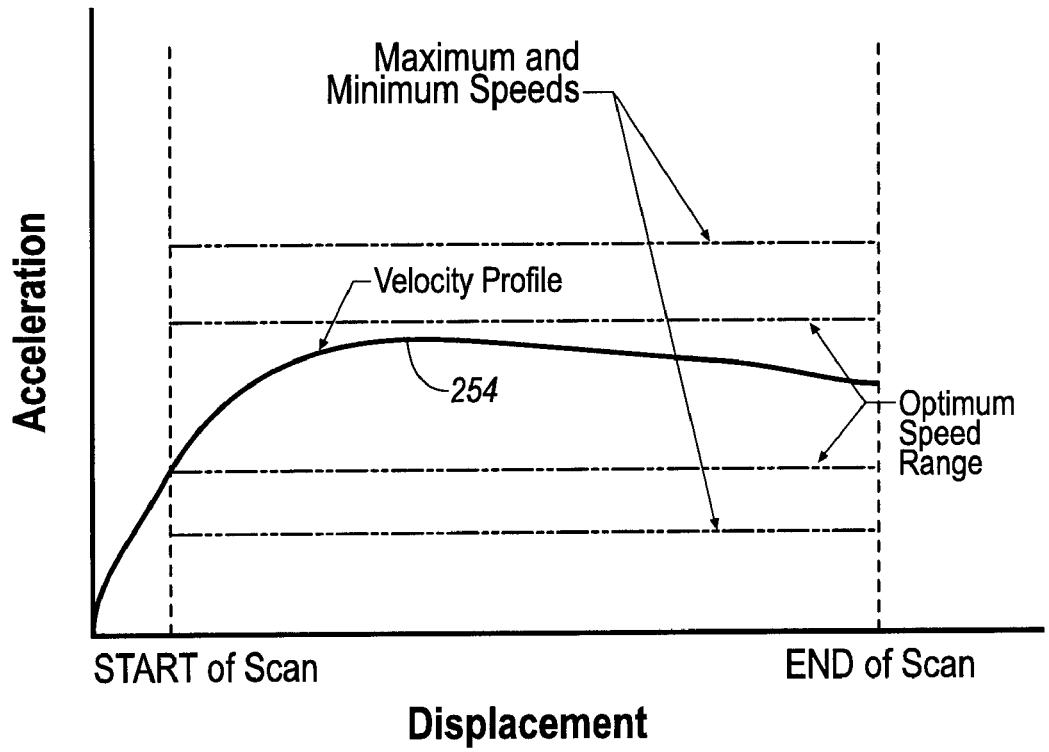
FIG. 10 is a plot of velocity versus displacement for the MICR subsystem when using the simple extension spring with the pneumatic cylinder.

FIG. 9 is a plot of force versus velocity for a pneumatic cylinder resistance load. As shown in FIG. 9 at 252, the physics of the pneumatic cylinder with a bleed orifice will provide constant resistance force at a constant speed. Motion of the MICR subsystem 82 in the desirable speed range will require resistance matched to the design of the spring. With this resistance load that increases as the spring increases the speed of actuating the scanning module, the system will reach an equilibrium speed that, even though variable, will remain within the optimum speed range. This will simplify the measure of the scanning speed and the natural tendency to scan at a constant speed should reduce the complexity of the electronics and reduce the error rate. FIG. 10 is a plot of velocity versus displacement for the MICR subsystem 82 when using the simple extension spring with the pneumatic cylinder, and depicts the velocity profile for the MICR subsystem 82 at 254.

In the preferred embodiment, the pneumatic cylinder will provide little or no resistance to motion in the return direction, allowing for a fast reset. This will be accomplished by use of reed valves to open and close orifices, depending on the direction of travel.

Typically, a signal indicative of the speed of the MICR subsystem 82 is provided to the MICR reading and recognition logic during the scan operation. In order for the image sensor and magnetic read head to properly read the check or document, the speed of the module must be known over the entire length of the item being scanned. The speed of the scan can be measured by any one of a number of speed measuring devices. The greater the variation of speed, the more sophisticated, and therefore more expensive, the electronics must be, as well as the greater the chance of error. A hand-operated document reader/imager requires a method of determining the position, and thus the speed, of the MICR and image sensors due to the variable speed nature of the manual operation. Existing solutions use optical encoders to provide this position feedback. Optical encoders are typically attached directly to the shaft of a wheel that moves along the document being scanned, or are connected to this shaft through a series of gears. For example, as shown in FIG. 3, a suitable encoder 260 measures the speed of the MICR subsystem. An output signal from encoder 260 is provided to the MICR reading and recognition logic during the scan operation.

FIG. 5 illustrates the moving MICR/image subsystem 82 in block diagram form, including the contact image sensor 84, MICR read head 86, and semi-automatic spring/cylinder mechanism 150. As shown, the document 100 is placed on the base of the reader/imager for front image capture. Moving MICR/image subsystem 82 is moved across the document 100 as indicated by arrow 102. Block 120 represents the MICR reading and recognition logic. Logic 120 includes a traditional MICR algorithm as understood by one of ordinary skill in the art.

In the traditional MICR algorithm, the waveform obtained from the read head 86 is compared against known MICR character peak profiles 122. If the recognition is successful, the MICR reading and recognition logic 120 determines the recognized MICR characters 124. The traditional MICR algorithm is applied during the front image capture by contact image sensor 84 of a face-up document. The captured image is indicated at 126.

Logic 120 must be capable of determining the speed of the MICR and image sensors due to the variable nature of the manual operation. In accordance with the invention, semi-automatic spring/cylinder mechanism 150 provides controlled and repeatable motion of the MICR/image subsystem 82. Speed feedback to the MICR reading and recognition logic 120 may be provided in any suitable way.

Figure 11:
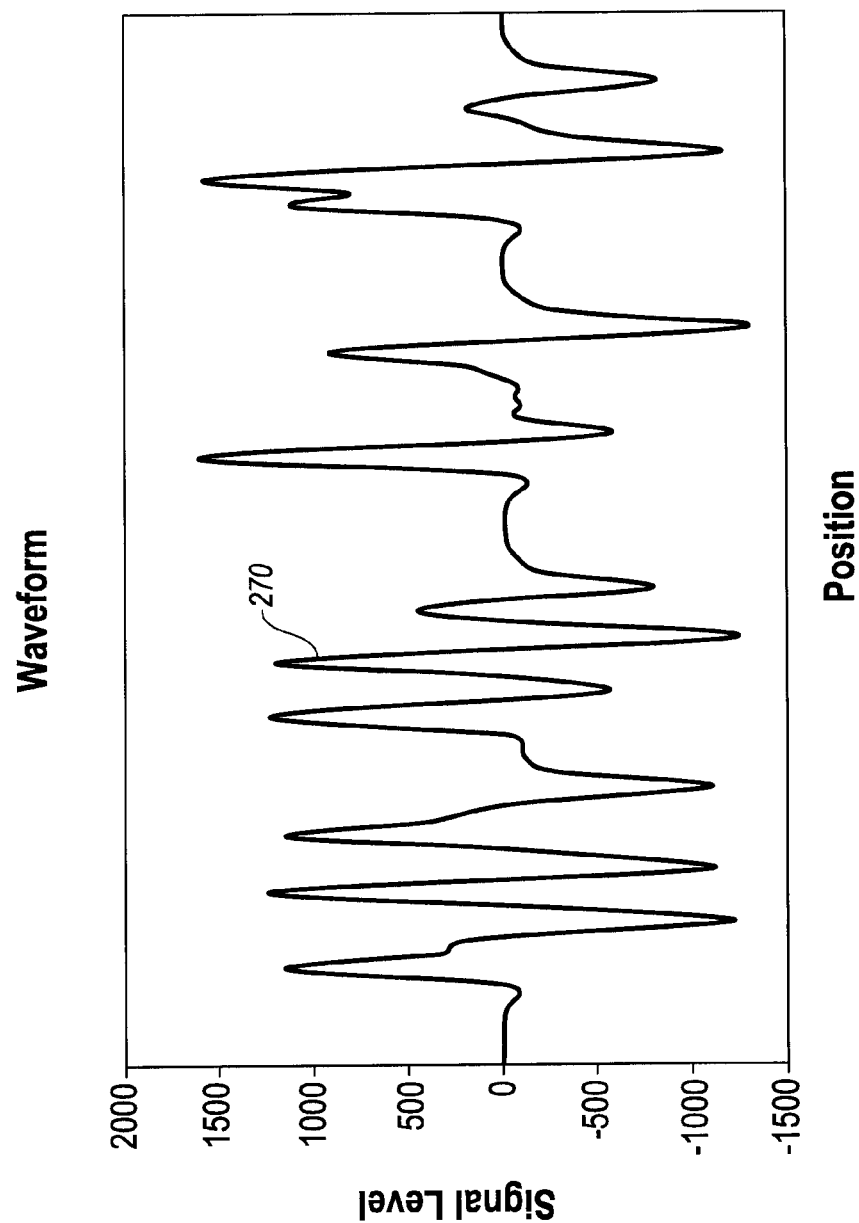
FIG. 11 illustrates a waveform for magnetic ink characters/symbols 3, 5, 7, Amount when the document containing the characters/symbols is inserted face up for front image capture in the hand-operated document reader/imager, and the magnetic ink characters/symbols are passed over from right to left.

FIG. 11 illustrates a waveform 270 for magnetic ink characters/symbols 3, 5, 7, Amount when the document containing the characters/symbols is inserted face up for front image capture in the hand-operated document reader/imager, and the magnetic ink characters/symbols are passed over from right to left. As illustrated, the x-axis represents the position of the read head, and the y-axis represents the signal level. The MICR reading and recognition logic is able to produce the waveform depicted at 270 based on the signal from the MICR read head and the speed feedback signal. In this way, the MICR reading and recognition logic can consider the MICR read head speed during reading and recognition. Consideration of MICR read head speed is required because speed variations affect the amount of time between the peaks of each character (as well as the amplitudes of the peaks due to the variation in the rate of change of the magnetic flux resulting from the variation in the read head speed). By considering the read head speed, the time information is able to be converted into distance information, which can be compared to the MICR character peak profiles as contained in ANS X9.100-20-2006.

In one implementation, in order to obtain optimal MICR results, the MICR read head signal is sampled at a resolution of 1,000 samples per inch. When the relative speed of the document is known and constant, the desired MICR sampling rate in samples/second is determined by converting from samples per inch to samples per second based on the constant speed. For example, if the relative speed difference between the document and the MICR read head is 20 inches per second, the MICR sampling rate must be 20,000 samples per second to achieve the desired 1,000 samples per inch.

In one approach to considering the MICR read head speed during reading and recognition, the sampling rate of the MICR subsystem is varied based on the sensed speed. For example, in order to achieve 1,000 samples per inch, a speed feedback mechanism commands the MICR sampling subsystem to sample every 0.001 inches. In the embodiment of the invention illustrated in FIGS. 3-5, this speed feedback is provided by the encoder 260. Similarly, speed feedback could be used to command the imaging subsystem to achieve a desired samples/inch resolution.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hand-operated device for reading a document including data in the form of magnetic characters that are discernable by electronics while also being readable by a human eye, comprising: a base including a document support surface; a document reader/imager connected to the base, wherein the document reader/imager is positioned proximate to and spaced apart from the document support surface of the base, wherein the document reader/imager is movably-disposed relative to the base, wherein the document reader/imager is movably-disposed upon a linear guide shaft; a semi-automatic driving mechanism including a biasing spring connected to the base; and a belt-and-pulley system including at least one pair of pulleys, and at least one belt supported by the at least one pair of pulleys, wherein the belt-and-pulley system connects the biasing spring to the document reader/imager, and wherein the at least one belt and the at least one pair of pulleys of the belt-and-pulley system includes a first belt supported by a pair of pulleys, a second belt supported by a second pair of pulleys, and a third belt connecting a pulley of the first pair of pulleys to a pulley of the second pair of pulleys, wherein the first belt is connected to the biasing spring, wherein the second belt is connected to the document reader/imager.

2. The hand-operated device according to claim 1, wherein the semi-automatic driving mechanism includes a pneumatic mechanism including a double-ended pneumatic cylinder, and a piston disposed within the double-ended pneumatic cylinder, wherein the first belt is connected to the piston.

3. The hand-operated device according to claim 2, wherein the cylinder includes at least one bleed orifice, wherein the at least one bleed orifice provides means for tuning variations in friction of the semi-automatic driving mechanism arising from manufacture and/or use of the hand-operated device.

4. The hand-operated device according to claim 2, wherein, upon a user-initiated movement of the document reader/imager across the base, the belt-and-pulley system causes the biasing spring to become cocked for storing energy that is subsequently released to permit the semi-automatic driving mechanism to provide means for providing a force to cause movement of the document reader/imager relative the base.

5. The hand-operated device according to claim 4 further comprising a latch-and-release mechanism connected to one or more of document reader/imager and the biasing spring.

6. The hand-operated device according to claim 5, wherein the latch-and-release mechanism provides means for latching the document reader/imager in a start position and releasing the energy stored by the biasing spring for causing movement of the document reader/imager relative the base.

7. The hand-operated device according to claim 4 wherein the second belt and the second pair of pulleys provide a belt-and-pulley speed-reduction mechanism that provides means for controlling velocity of the movement of the document reader/imager in response to the force provided by the semi-automatic driving mechanism that causes the movement of the document reader/imager relative the base.

8. The hand-operated device according to claim 4, wherein the document reader/imager includes a magnetic ink character recognition (MICR) read head that provides means for reading the magnetic characters of the document placed upon document support surface of the base.

9. The hand-operated device according to claim 8, wherein the pneumatic mechanism is arranged to provide means for driving the piston at a rate that is proportional to a speed for reading the magnetic characters of the document, wherein the magnetic characters are provided in MICR format.

10. The hand-operated device according to claim 1, wherein the document reader/imager includes an image sensor.

11. A hand-operated device for reading a document including data in the form of magnetic ink character recognition (MICR) characters that are discernable by electronics while also being readable by a human eye, comprising:
a base including a document support surface;
a MICR document reader/imager movably-connected to the base, wherein the MICR document reader/imager includes an MICR read head;
a semi-automatic driving mechanism including a biasing spring connected to the base; and
a belt-and-pulley system including at least one pair of pulleys, and at least one belt supported by the at least one pair of pulleys, wherein the belt-and-pulley system connects the biasing spring to the document reader/imager, wherein the at least one belt and the at least one pair of pulleys and the of belt-and-pulley system includes a first belt supported by a pair of pulleys, a second belt supported by a second pair of pulleys, and a third belt connecting a pulley of the first pair of pulleys to a pulley of the second pair of pulleys, wherein the first belt is connected to the biasing spring, wherein the second belt is connected to the document reader/imager.

12. The hand-operated device according to claim 11, wherein the semi-automatic driving mechanism includes a pneumatic mechanism including a double-ended pneumatic cylinder, and a piston disposed within the double-ended pneumatic cylinder, wherein the first belt is connected to the piston.

13. The hand-operated device according to claim 12, wherein the cylinder includes at least one bleed orifice, wherein the at least one bleed orifice provides means for tuning variations in friction of the semi-automatic driving mechanism arising from manufacture and/or use of the hand-operated device.

14. The hand-operated device according to claim 12, wherein, upon a user-initiated movement of the document reader/imager across the base, the belt-and-pulley system causes the biasing spring to become cocked for storing energy that is subsequently released to permit the semi-automatic driving mechanism to provide means for providing a force to cause movement of the document reader/imager relative the base.

15. The hand-operated device according to claim 14 further comprising:

a latch-and-release mechanism connected to one or more of document reader/imager and the biasing spring.

16. The hand-operated device according to claim 15, wherein the latch-and-release mechanism provides means for latching the document reader/imager in a start position and releasing the energy stored by the biasing spring for causing movement of the document reader/imager relative the base.

17. The hand-operated device according to claim 14 wherein the second belt and the second pair of pulleys provide a belt-and-pulley speed-reduction mechanism that provides means for controlling velocity of the movement of the document reader/imager in response to the force provided by the semi-automatic driving mechanism that causes the movement of the document reader/imager relative the base.

18. The hand-operated device according to claim 14, wherein the pneumatic mechanism is arranged to provide means for driving the piston at a rate that is proportional to a speed for reading the magnetic characters of the document, wherein the magnetic characters are provided in MICR format.

19. The hand-operated device according to claim 11, wherein the document reader/imager includes an image sensor that provides means for capturing an image of the document.

* * * * *